United States Patent
Hutt

(10) Patent No.: US 11,125,376 B2
(45) Date of Patent: Sep. 21, 2021

(54) FLUID LEAK REPAIR

(71) Applicant: Enduratec Ltd., Cheltenham (GB)

(72) Inventor: Bruce Hutt, Tewkesbury (GB)

(73) Assignee: Enduratec Ltd., Cheltenham (GB)

( * ) Notice: Subject to any disclaimer, the term of this patent is extended or adjusted under 35 U.S.C. 154(b) by 0 days.

(21) Appl. No.: 16/783,765

(22) Filed: Feb. 6, 2020

(65) Prior Publication Data

US 2020/0173598 A1    Jun. 4, 2020

Related U.S. Application Data

(62) Division of application No. 15/644,649, filed on Jul. 7, 2017, now abandoned.

(30) Foreign Application Priority Data

Jul. 22, 2016    (GB) ...................... 1612736

(51) Int. Cl.
- *F16L 55/168*    (2006.01)
- *F16L 55/175*    (2006.01)
(Continued)

(52) U.S. Cl.
CPC ......... *F16L 55/1686* (2013.01); *F16L 55/175* (2013.01); *B29C 63/10* (2013.01);
(Continued)

(58) Field of Classification Search
CPC ... F16L 55/10; F16L 55/1003; F16L 55/1063; F16L 55/168; F16L 55/1683;
(Continued)

(56) References Cited

U.S. PATENT DOCUMENTS

| | | | | |
|---|---|---|---|---|
| 4,557,507 A | * | 12/1985 | Commandeur | ......... F16L 27/12 285/45 |
| 5,030,493 A | * | 7/1991 | Rich | ....................... B29C 73/10 428/63 |

(Continued)

FOREIGN PATENT DOCUMENTS

| | | |
|---|---|---|
| EP | 0574060 A1 | 12/1993 |
| JP | 06320672 A * | 11/1994 ............... F16L 58/02 |

OTHER PUBLICATIONS

"New silicone tape from Permatex creates instant waterproof seal," Jun. 15, 2015, Auto Service Professional. https://www.autoserviceprofessional.com/39337/new-silicone-tape-from-permatex-creates-instant-waterproof-seal (Year: 2015).*

(Continued)

*Primary Examiner* — Philip C Tucker
*Assistant Examiner* — Brian R Slawski
(74) *Attorney, Agent, or Firm* — Umberg Zipser LLP; Ryan Dean

(57) ABSTRACT

Fluid leak repair kits are described comprising a putty, self-amalgamating tape, and a composite material for use in encompassing the self-amalgamating tape. The composite material comprises a flexible sheet or tape and a matrix component for binding the flexible sheet or tape. The matrix component comprises a resin or water-activated matrix component which, when cured, forms an outer shell.

11 Claims, 2 Drawing Sheets

(51) Int. Cl.
| | |
|---|---|
| *B29C 65/00* | (2006.01) |
| *B29C 73/10* | (2006.01) |
| *B29C 63/10* | (2006.01) |
| *F16L 55/18* | (2006.01) |
| *B32B 27/08* | (2006.01) |
| *F16L 55/10* | (2006.01) |
| *B32B 27/12* | (2006.01) |
| *B29C 73/02* | (2006.01) |
| *B29C 65/48* | (2006.01) |
| *B29C 65/50* | (2006.01) |

(52) U.S. Cl.
CPC .......... *B29C 65/484* (2013.01); *B29C 65/486* (2013.01); *B29C 65/5057* (2013.01); *B29C 66/301* (2013.01); *B29C 66/72* (2013.01); *B29C 66/7212* (2013.01); *B29C 66/73771* (2013.01); *B29C 73/02* (2013.01); *B29C 73/10* (2013.01); *B32B 27/08* (2013.01); *B32B 27/12* (2013.01); *F16L 55/1003* (2013.01); *F16L 55/18* (2013.01)

(58) Field of Classification Search
CPC ..... F16L 55/1686; F16L 55/175; F16L 55/18; C09K 3/12; Y10T 428/20; Y10T 29/49732; B29C 65/00; B29C 65/48; B29C 65/483; B29C 65/484; B29C 65/486; B29C 65/50; B29C 65/5057; B29C 65/72; B29C 66/00; B29C 66/301; B29C 66/71; B29C 66/72; B29C 66/721; B29C 66/7212; B29C 66/73771; B29C 73/00; B29C 73/02; B29C 73/04; B29C 73/10; B29C 63/06; B29C 63/08; B29C 63/10; B32B 27/06; B32B 27/08; B32B 27/12
USPC ...... 156/60, 71, 84, 85, 86, 90, 94, 98, 160, 156/162, 184, 185, 187, 188, 191, 192, 156/193, 195, 196, 212, 213, 229, 250, 156/256, 264, 265, 293, 294, 308.2, 156/309.6, 327, 329, 331.7; 138/97, 98, 138/99, 141, 144; 29/402.01, 402.09, 29/402.18, 402.19; 428/36.1, 105, 113, 428/114, 222, 294.7, 297.4, 300.7; 442/86, 149, 179, 180
See application file for complete search history.

(56) References Cited

U.S. PATENT DOCUMENTS

| | | | | |
|---|---|---|---|---|
| 5,328,157 | A * | 7/1994 | Mantey | B22D 1/005 266/47 |
| 5,531,485 | A * | 7/1996 | House | E02D 29/12 156/71 |
| 5,732,743 | A * | 3/1998 | Livesay | B29C 65/4845 138/99 |
| 2002/0106464 | A1 | 8/2002 | Bazinet | |
| 2002/0127363 | A1* | 9/2002 | Kaneko | B29C 65/76 428/40.1 |
| 2007/0125437 | A1* | 6/2007 | Lazzara | F16L 55/1686 138/99 |
| 2007/0207294 | A1 | 9/2007 | Fedeli et al. | |
| 2010/0237606 | A1* | 9/2010 | Lazzara | G02B 6/508 285/123.12 |
| 2015/0050854 | A1 | 2/2015 | Quinn et al. | |

OTHER PUBLICATIONS

Mott, P. H. and Roland, C. M. "Limits to Poisson's ratio in isotropic materials," Oct. 20, 2009, Physical Review B. https://journals.aps.org/prb/pdf/10.1103/PhysRevB.80.132104 (Year: 2009).*
"New silicone tape from Permatex creates instant waterproof seal," Jun. 15, 2015, Auto Service Professional. https://www.autoserviceprofessional.com/article/95296/new-silicone-tape-from-permatex-creates-instant-waterproof-seal?force-desktop-view=1 (Year: 2015).
United Kingdom Intellectual Property Office; search report dated Jan. 13, 2017, Patent Appln. No. GB1612736.7, 3 pages.

* cited by examiner

FLUID LEAK REPAIR

This application claims priority to U.S. non-provisional patent application having Ser. No. 15/644,649 filed on Jul. 7, 2017, which itself claims priority to United Kingdom patent application having serial number 1612736.7 filed on Jul. 22, 2016. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF INVENTION

This invention relates to a kit and method for repairing a fluid, such as gas, water or steam, leak in a pipe or conduit.

BACKGROUND

A "fluid" as used herein is intended to be broadly interpreted as referring to any gas or liquid that flows under pressure in a pipe or conduit. Examples used herein include a natural gas supply pipe and a water/steam carrying pipe (particularly in, for example, offshore applications), but it is to be understood that the present invention is not necessarily intended to be limited in this regard.

Gas supply systems in commercial and domestic settings typically comprise a network of sections of rigid pipework connected together in a required configuration via screw threaded joints or coupling members, wherein a jointing paste is applied to the inner surface of the coupling member and/or the outer surface of a distal end of a pipe section and the coupling member is then screwed or pushed onto that end of the pipe section. A further pipe section can be similarly joined on the other side of the coupling member so as to create a fluid-tight seal between the two pipe sections that permits fluid flow therethrough. Coupling members of various shapes and configurations can be utilised to create straight connections or bends, for example, in the pipework and the ultimate aim is to create a sealed system in the form of a rigid network of permanently connected pipework through which fluid can flow under pressure.

Difficulties arise, however, in the event of a leak in one of the pipe sections, which causes fluid to leak from the system. In all cases, this would cause an unacceptable pressure drop in the fluid flow system, but in many cases (e.g. in a gas supply system), the resultant health and safety implications and danger posed by fluid leaking into the surrounding atmosphere creates an emergency situation that requires immediate remedial action. In the case of, for example, a gas supply system, the gas supply must be switched off unless and until the leak has been adequately repaired.

Permanently and reliably repairing a leak in a rigid pipe network, using known methods, is a complex and laborious task which must be undertaken by more than one trained operative. In most cases, a permanent repair requires the affected section of pipework to be removed and replaced. However, this is not a straightforward task, as loosening and removing a section of pipe from the rigid network can result in other couplings and sections being undermined.

US Patent Application no. 2007/0125437 describes a repair kit for a natural gas pipe, comprising a deformable leak sealant, a pressure sealant and a so-called encapsulator. The leak sealant is a curing or hardening putty, such as an epoxy putty, and is applied at the location of the leak. Next, a rubber tape (the "pressure sealant") is wrapped around the leak sealant, forcing it into a pinhole leak or joint leak as the epoxy putty cures. Finally, an encapsulator in the form of a cloth-like wrap that hardens after setting, is applied around the repair to maintain the leak sealant and pressure sealant in position so that they maintain a seal as the pressure is increased (i.e. as the pipe is brought back on line).

However, the described kits only suitable for repairing natural gas pipes, and requires the pipe to be taken out of commission whilst the repair is undertaken, to allow time for the putty to harden and also for the encapsulator to harden, because it is these two elements which effect and maintain the seal once higher pressures are applied (whereas the rubber tape used in the described method does not continue to exert a significant force around the pipe after application). Thus, repairing a leak using the described kit and method takes a relatively long time, during which the pipe cannot be used at pressure.

It would, therefore, be desirable to provide a kit and method of permanently repairing a fluid leak in a pipe or conduit that can be sued in a number of different environments and that ameliorates at least some of the issues outlined above. There is also a need for a kit and method for repairing such fluid leaks, to create a mechanically robust and permanent seal. There is also a need for a kit and method for repairing a fluid leak in a pipe without requiring several highly skilled operatives and a relatively long period of time, during which the fluid system is inoperable. It would also be desirable to provide a kit and method for performing permanent "live leak" repairs in a pipe or conduit at full pressure, if required. Embodiments of the present invention seek to address at least some of these needs.

SUMMARY OF THE INVENTION

In accordance with a first aspect of the present invention, there is provided a fluid leak repair kit, comprising:
 a putty;
 a self-amalgamating tape; and
 a composite material for use in encompassing the self-amalgamating tape, said composite material comprising a flexible sheet or tape and a matrix component for binding the flexible sheet or tape, the matrix component comprising a resin or water-activated matrix component which, when cured, forms an outer shell.

In an exemplary embodiment, the flexible sheet or tape may comprise a woven material. The flexible sheet or tape may comprise a fibre glass or carbon fibre material. The flexible sheet or tape may be pre-impregnated with the matrix material or a component for forming the matrix material. Optionally, the matrix component may be a polymeric water soluble or water-activated substance. The matrix component may be a polyurethane resin. In one exemplary embodiment, the matrix component may comprise 1,2-propaniedol, 2-ethyl-2-(hydroxymethyl), polymer with bis(isocyanatomethyl) benzene.

Optionally, the kit may further comprise a stretch wrap material for placing over said composite material whilst said matrix component cures.

The self-amalgamating tape may comprise a silicone self-amalgamating tape.

The kit may comprise a gas leak repair kit, wherein said putty may be a non-curing putty, such as a non-curing silicone putty.

The kit may comprise an liquid (e.g. water, including steam) leak repair kit, wherein said putty is a two-part curing putty, such as a two-part curing silicone putty.

In accordance with another aspect of the present invention, there is provided a method of repairing a fluid leak in a pipe or conduit, the method comprising:

applying a layer of putty to said pipe or conduit at a location of said leak to seal it;

wrapping, at tension, a self-amalgamating tape around said layer of putty to cover it;

contacting a flexible sheet or tape with either:
a resin, or
water to activate a water-activated matrix component; and encompassing the self-amalgamating tape with the flexible sheet or tape such that the resin or water-activated matrix component binds with the flexible sheet or tape to form an outer shell with the flexible sheet or tape to substantially surround the joint.

The self-amalgamating tape may be wrapped at full tension, in which its width is 75% or less of its original width.

The method may further comprise, after wrapping, at tension, a self-amalgamating tape around said layer of putty to create a high tension wrapped region, wrapping, at low tension, a further layer of said self-amalgamating tape around said high tension wrapped region to cover it.

The method may be a method of repairing a gas leak, wherein said putty is a non-curing putty, such as a non-curing silicone putty.

The method may be a method of liquid e.g water, including steam) leak repair, wherein said putty is a two-part curing putty, such as a two-part curing silicone putty.

The flexible sheet or tape may comprise a woven material. The flexible sheet or tape may comprise a fibre glass or carbon fibre material. The flexible sheet or tape may be pre-impregnated with the matrix material or a component for forming the matrix material. The matrix component may be a polymeric water soluble or water-activated substance. The matrix component may be a polyurethane resin. The matrix component may comprise 1,2-propaniedol, 2-ethyl-2-(hydroxymethyl), polymer with bis(isocyanatomethyl) benzene.

The method may further comprise wrapping a stretch wrap material over said composite material whilst said matrix component cures. The self-amalgamating tape may comprise a silicone self-amalgamating tape. The method may comprise cutting lengths of said self-amalgamating tape prior to wrapping each said length self-amalgamating tape, at tension, around said layer of putty. The lengths of self-amalgamating tape may be cut at an angle, such as substantially 45°.

Thus, and in contrast to the prior art described above, the leak repair created using the kit and/or method of the present invention relies on the quality and application of the self-amalgamating tape layer to make and maintain the seal, rather than the putty or the outer shell. This means that the repair is substantially instant and effective as soon as the self-amalgamating tape has been applied. The outer shell is only there to protect the self-amalgamating tape layer from damage (which might otherwise undermine the repair). There is no cure time, and the repair can be effected "live" and under high pressure if required. The self-amalgamating tape layer, once applied, instantly exerts a continuous, long-term pressure on the non-curing putty to make and maintain the seal; whereas, in contrast, in the prior art, the rubber tape layer is applied and used to press the putty into the leak hole as it cures. This type of tape does not continue to exert a significant compressive force around the pipe after application. Indeed, once applied, the tape breaks down and although it conforms, the compressive force weakens rapidly. It is, instead, the 'encapsulator' which, in the prior art, holds the leak sealant and the pressure sealant in place so that they maintain a seal as the pressure is increased. In the present invention, the function of the outer layer is just to provide mechanical protection for the repair: the seal itself is made by the self-amalgamating tape layer. Because, in the prior art, the outer layer is an important part of the overall seal, the grade of the composite material used therefor may need to be much higher than that required for the present invention.

DETAILED DESCRIPTION

The kits of the present invention are used to create permanent repairs of fluid leaks in pipes. An example will now be described in which the fluid is natural gas within a sealed domestic or commercial gas supply system.

Thus, in general, a gas leak repair kit according to an exemplary embodiment of the present invention comprises a non-curing silicone putty, a high grade silicone self amalgamating tape (SAT) and woven glass fibre bandage with a water activated binder.

It will be appreciated that, using the kit and method according to this exemplary embodiment of the present invention, a permanent gas leak repair can be effected, quickly, reliably and efficiently, by a single operative. An exemplary method is set out in detail below:

Preparation

1. When a leak is detected, its source must first be identified. Leak detection solution can be used for this purpose (see FIG. 1A of the drawings), although other methods will be known to a person skilled in the art. Optionally, once the location on the pipe of the leak has bee identified, this can be marked, if necessary.

Figures 1A, 1B, 1C, 1D:
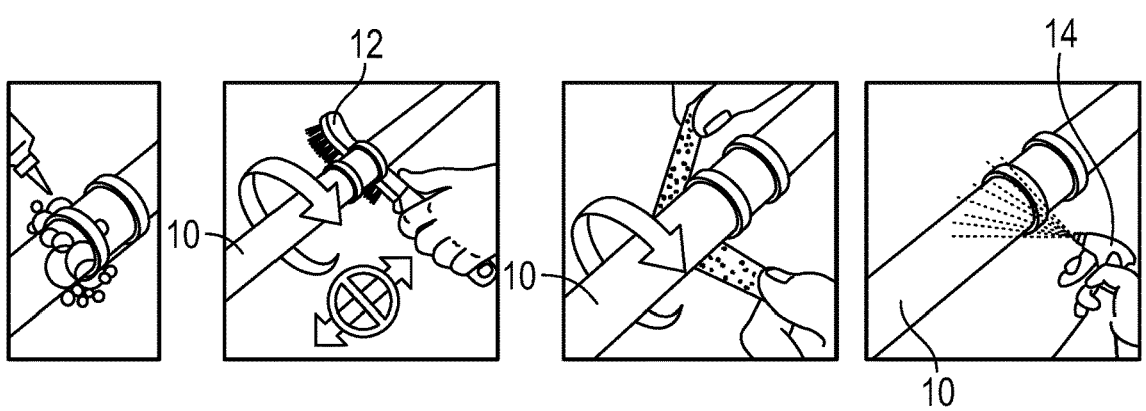
FIGS. 1A to 1H and 1J-1L are schematic illustrations of respective steps of a method of gas leak or liquid leak repair according to an exemplary embodiment of the invention.

2. Referring to FIG. 1B of the drawings, next the surface of the pipe 10 at the location of the leak must be properly prepared. Rust and debris can be removed using a wire brush 12—optionally at least 30 cm either side of the leak area—following which, the surface around the circumference of the pipe 10 can be sanded (see FIG. 1C of the drawings) to achieve a smooth finish.

3. Referring now to FIG. 1D of the drawings, the region around the leak must next be cleaned. First, clean water and an atomiser spray bottle 14 can be used to wash away all traces of leak detection solution (if used) and abrasion grit. Then the pipe 10 and surrounding area is dried using a clean rag, for example.

Figures 1E, 1F:
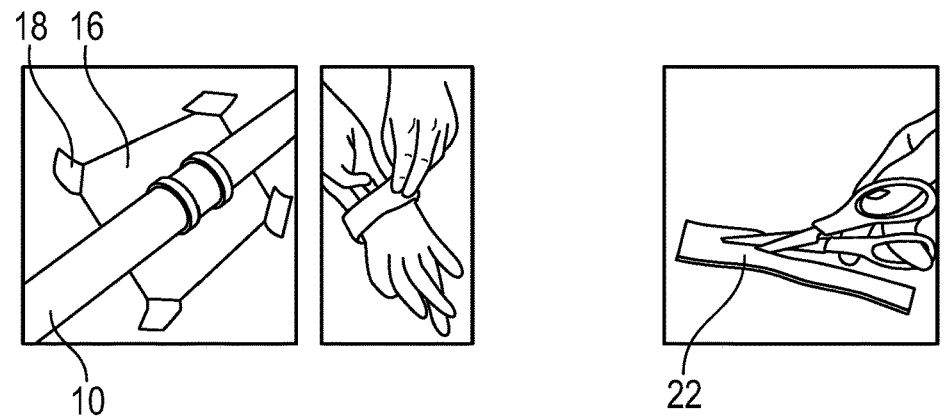

4. Referring to FIG. 1E of the drawings, anywhere that the SAT could touch during the repair process, needs to be clean. Thus, using a plastic sheet 16 and masking tape 18, a region behind the area to be repaired can be covered. Ideally, an operative will subsequently put on powder free gloves to complete the repair process, to ensure that the fusion of the SAT is not reduced by transfer of, for example, dirt, oils, perfumes, nicotine, tar, soap or skin from the operative's hands.

Silicone Putty

5. Next, and referring to FIG. 1F of the drawings, the right shape of putty is prepared. The putty is required to 'plug' the gap between the coupling member or joint 20 and the pipe 10, and the right 'shape' of putty for this purpose will, therefore, dependent on the size and configuration of the area to be 'plugged' thereby. It is envisaged that an operative may have to cut a length of putty 22 length ways, possibly generally in half, to create the right shape for a particular job.

Figures 1G, 1H:
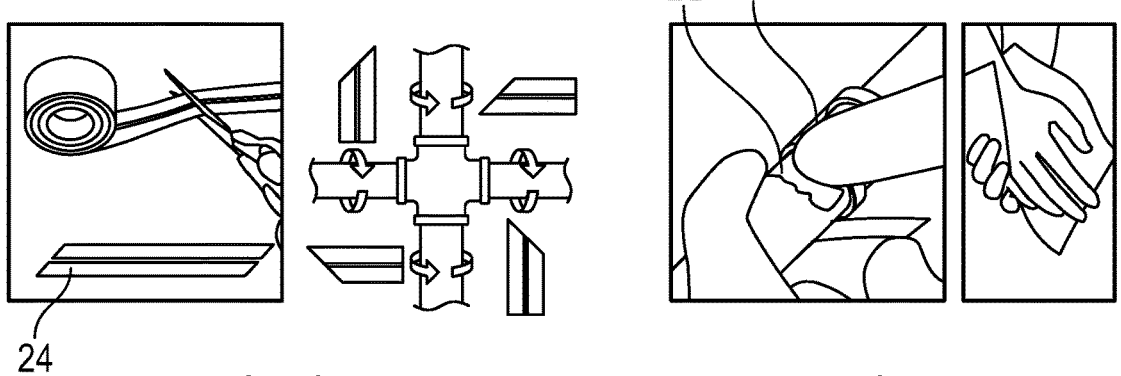

6. Referring to FIG. 1G of the drawings, a number of 20 cm strips 24 of the self-amalgamating tape (SAT) is cut by the operative. The number of strips required for a repair is dependent on the size of the coupling member or joint at which the repair is being made, and a table indicating the number of strips of SAT required for each of a number of standard sized joints, is provided below:

| Joint size (inches) | Number of strips of SAT required |
|---|---|
| 3/4 | 3 |
| 1 | 4 |
| 1 1/4 | 5 |
| 1 1/2 | 6 |
| 2 | 9 |

Each strip of SAT is cut using a 45° angle, as illustrated in FIG. 1G.

7. Referring to FIG. 1H of the drawings, the putty 22 is used to create a so-called wrapping surface. It is manually pushed and manipulated into the gaps between the joint 26 and the pipe 10 to fill any holes, thread or pitted areas, and should not be built up higher than the joint itself. During this process, the operative covers the thread and creates an incline from the pipe 10 up to the joint 26, by applying pressure and creating a smooth finish by hand.

Self-Amalgamating Tape

Figures 1J, 1K, 1L:
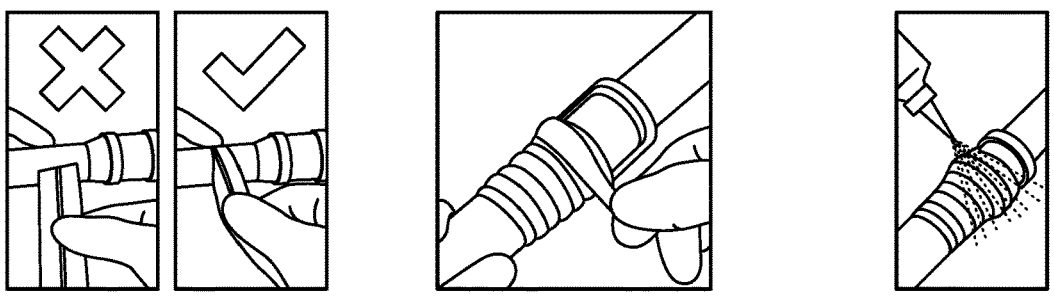

8. Next, the required number of strips of SAT are wrapped, one by one, over the putty. Such wrapping should be done at full tension, which occurs when the tension therein is such that the colour lightens and its width is reduced to at least 3/4 of its original width. Ideally, when wrapping, all leading and finishing edges of the strips should be fully concealed within the wrap. This is the purpose of cutting the tape strips at a 45° angle: the leading edge thus follows the circumference of the pipe rather than lying parallel to it (as it would if the tape was cut square), as illustrated in FIG. 1J of the drawings.

9. Thus, starting about 25 mm from the end of the thread, the operative places the leading edge of a strip of tape onto the pipe and starts wrapping at full tension, overlapping each layer by 80-90%. For each subsequent tape strip, the leading edge is placed fully over the previously applied layer, and then covered 100% before progressing in the wrapping direction. Once the diameter of the wrapped region is the same as that of the joint 26, the operative continues wrapping over the edge, as shown in FIG. 1K of the drawings, wrapping this area with around 90% overlap. The very high tensile strength of the SAT, causes the tightly wrapped layer to produce a significant 'squeeze' around the pipe. The layers of tape bond together through molecular fusion. Once applied, the final wrap retains all of the applied tension. The resulting high tension silicon sleeve can 'squeeze' down for 30 years or more (subject to environmental conditions). As there is no adhesive, this SAT will endure harsh temperature fluctuations, full submersion and UV light.

10. Once the high tension layer is complete, the operative may wrap back over the wrapped region with a low tension layer, which acts as impact protection. Sufficient tension should be applied to prevent air from becoming trapped therein and the operative can push down on the low tension layer to aid fusion.

Re-Test for Leakage

11. Referring to FIG. 1L of the drawings, the operative next re-checks the joint for leaking to ensure that the joint is properly sealed before moving on to the next step.

Armour

Figure 2:
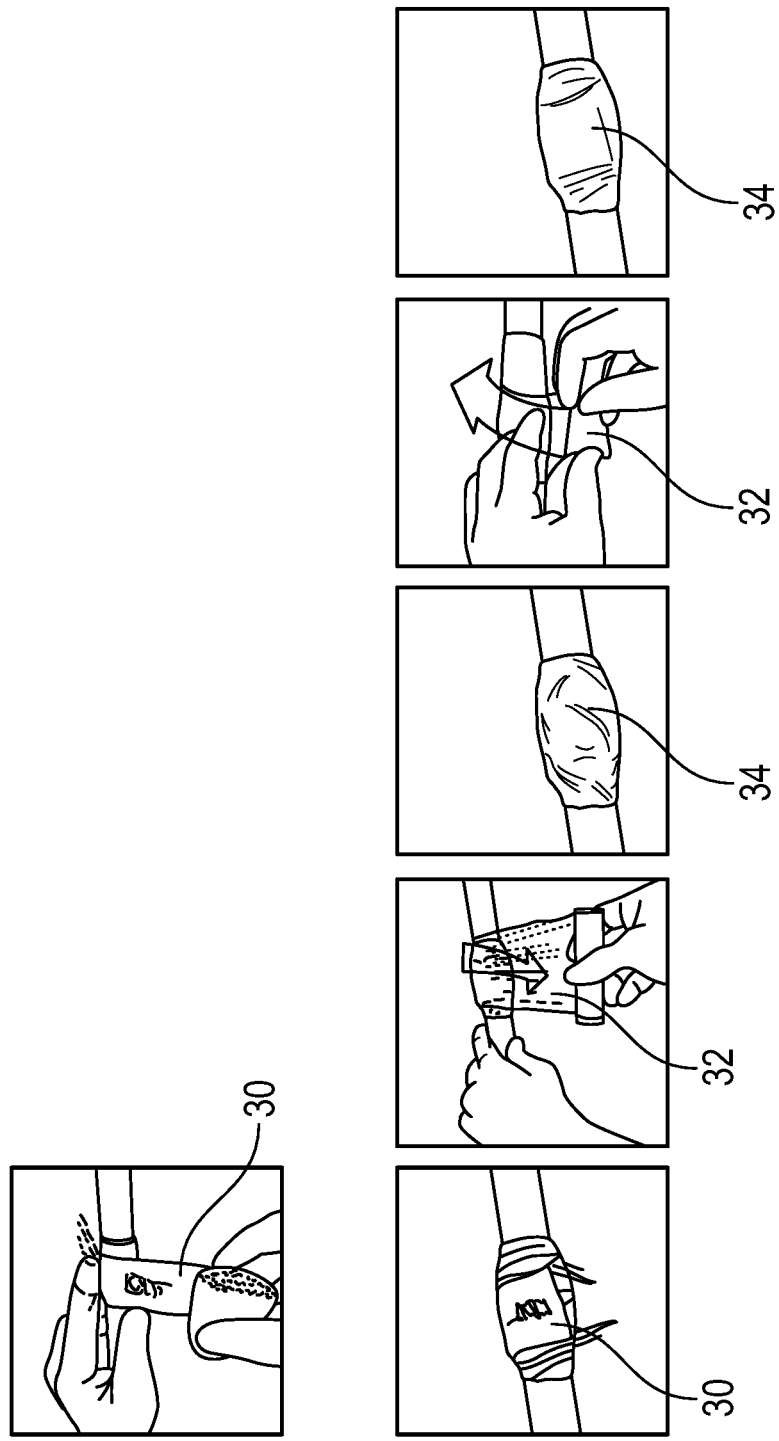
FIG. 2 is a schematic illustration of respective steps at the end of a method of gas leak or liquid leak repair according to an exemplary embodiment of the invention, for forming the outer shell or armour around the repair.

12. Referring to FIG. 2 of the drawings, the final step in the method involves applying the so-called 'armour'. Thus, the operative removes the glass fibre bandage from its packaging and places it in water to activate the binder—this can be done by soaking or using a spray bottle containing water during the wrapping process. The bandage may, for example, comprise a woven fibre glass tape and may be pre-impregnated with 1,2-propaniedol, 2-ethyl-2-(hydroxymethyl), polymer with bis (isocyanatomethyl) benzene. Once moist, the bandage 30 is wrapped around the SAT wrapped region, starting in the centre and wrapping with a 50% (approximately) overlap. The operative wraps back and forth, covering around 20 mm beyond the end of the SAT wrap and ending with all strands on top of previously wrapped layers. Next, the operative quickly applies a stretch wrap 32 tightly over the bandaged area and compresses the region while it cures to ensure a close cell structure is formed, to maximise its strength. Once the armour 34 is hard (around 5 minutes, depending on the surrounding ambient temperature) the stretch wrap can be removed. Thus, in an exemplary embodiment, wherein the bandage is a woven fibre glass material pre-impregnated with 1,2-propaniedol, 2-ethyl-2-(hydroxymethyl), polymer with bis(isocyanatomethyl) benzene, the SAT wrapped or repair region wrapped therewith may be left for about 5 minutes, until the 1,2-propaniedol, 2-ethyl-2-(hydroxymethyl), polymer with bis (isocyanatomethyl) benzene has formed a hard outer shell substantially encompassing and extending along the length of the repair region. It will, of course, be appreciated that the time required for the joint to set may depend on several factors such as type of composite materials, ambient temperature and other environmental factors. The armour, in this exemplary embodiment, will be fully cured after around 60 minutes and can accept paint, if required, around 24 hours after the stretch wrap has been removed. Once cured, the layer provides a puncture proof barrier, safeguarding the seal against damage.

An liquid (e.g. water including steam) leak repair kit, particularly but not necessarily exclusively suitable for use in offshore applications, for repairing leaks on pipework up to 4 inches in diameter and with operating pressures up to 20 bar, according to an exemplary embodiment of the present invention is similar in many respects to the gas repair leak described above, and the method steps are substantially identical. However, as well as the high grade silicone self-amalgamating tape (SAT) and glass fibre bandage with a water activated binder, this kit includes a two-part curing silicone putty (instead of the non-curing silicone putty used in the gas repair method described above). This two-part, curing silicone putty is used to 'plug' the leak. Once mixed, applied and compressed, the putty cures, giving a bespoke silicone moulding. Between the process fluid and compression of the SAT layer (hereinafter described), this precisely fitting "gasket" ensures a good seal at higher pressures.

The associated liquid leak repair method is substantially identical to the gas leak repair method described in detail above, except in that the putty, which is a two-part curing putty, must be prepared for use before application to the leakage area. To prepare the putty, the operative must mix the two-part putty by kneading and rolling the two parts together. The above-described liquid leak repair kit and the repair method is suitable for salt water, fresh water, waste pipes and steam. Indeed, it is to be understood that the 'offshore' leak repair kit has been specifically described above, but the kit and method so described is equally applicable to any liquid leak repair, and the present invention is not necessarily intended to be limited in this regard.

It will be appreciated by a person skilled in the art, from the foregoing description, that modifications and variations can be made to the described embodiments without departing from the scope of the invention as defined by the appended claims. For example, the armour may be formed using woven carbon fibre bandage, instead of glass fibre. The bandage may, as described above, be impregnated with a matrix material or a component of a matrix material that is water soluble or water activated (for example, the matrix may be polyurethane). However, in alternative embodiments, the matrix component may be epoxy resin (and the kit may include a supply of epoxy resin) which, when applied to the woven bandage, sets and hardens to provide the required armour. Indeed, two part resins (for example, epoxy based resin systems) are available which may be suitable for provision in a kit form and mixed when required.

What is claimed is:

1. A method of repairing a fluid leak in a pipe or conduit (10), characterized in that the method comprises:
    applying a layer of non-curing putty (22) to said pipe or conduit (10) at a location of said leak to seal said leak;
    wrapping, at tension, a self-amalgamating tape (24) around said layer of non-curing putty (22) to cover said layer of non-curing putty and form a tension wrapped region at said location of said leak;
    contacting a flexible sheet or tape (30) with either:
       a resin, or
       water to activate a water-activated matrix component; and
    encompassing the self-amalgamating tape (24) with the flexible sheet or tape (30) such that the resin or water-activated matrix component binds with the flexible sheet or tape (30) to form an outer shell with the flexible sheet or tape (30) to substantially surround said tension wrapped region.

2. A method according to claim 1, wherein said self-amalgamating tape (24) is wrapped at full tension, in which its width is 75% or less of its original width; the method optionally further comprising, after wrapping, at tension, said self-amalgamating tape (24) around said layer of putty (22) to create said tension wrapped region, wrapping, at less than full tension, a further layer of said self-amalgamating tape (24) around said tension wrapped region to cover said tension wrapped region.

3. A method according to claim 1, wherein said flexible sheet or tape (30) comprises a woven material or wherein said flexible sheet or tape (30) comprises a fibre glass or carbon fibre material.

4. A method according to claim 1, wherein said flexible sheet or tape (30) is pre-impregnated with said matrix component or a component for forming said matrix component.

5. A method according to claim 4, wherein said component for forming matrix component comprises a polymeric water soluble or water-activated substance.

6. A method according to claim 4, wherein said flexible sheet or tape (30) is pre-impregnated with a polyurethane resin.

7. A method according to claim 4, wherein said matrix component comprises 1,2-propanediol, 2-ethyl-2-(hydroxymethyl), polymer with bis(isocyanatomethyl) benzene.

8. A method according to claim 1, further comprising wrapping a stretch wrap material (32) over the flexible sheet or tape (30) including the matrix component whilst said matrix component cures; and/or wherein said self-amalgamating tape (24) comprises a silicone self-amalgamating tape (24).

9. A method according to claim 1, comprising cutting lengths of said self-amalgamating tape (24) prior to wrapping each said length of self-amalgamating tape, at tension, around said layer of putty (22).

10. A method according to claim 9, wherein said lengths of self-amalgamating tape (24) are cut at an angle of 45°.

11. A method according to claim 1, wherein said non-curing putty (22) is a silicone non-curing putty (22).

* * * * *